United States Patent [19]

Edwards et al.

[11] Patent Number: 4,494,386
[45] Date of Patent: Jan. 22, 1985

[54] VAPOR REFRIGERATION CYCLE SYSTEM WITH CONSTRAINED ROTARY VANE COMPRESSOR AND LOW VAPOR PRESSURE REFRIGERANT

[75] Inventor: Thomas C. Edwards, Rockledge, Fla.; Wayne C. Shank, Pima, Ariz.

[73] Assignee: Rovac Corporation, Rockledge, Fla.

[21] Appl. No.: 358,056

[22] Filed: Mar. 15, 1982

[51] Int. Cl.$^3$ .............................................. F25D 9/00
[52] U.S. Cl. ......................................... 62/402; 62/499
[58] Field of Search ................................... 62/402, 499

[56] References Cited

U.S. PATENT DOCUMENTS 4,299,097  11/1981  Shank et al. ........................ 62/229

OTHER PUBLICATIONS

SAE Technical Paper Series 810505, "Preliminary Development of a High Efficiency Low Vapor Pressure Non-Fluorocarbon Air Conditioning System", published Feb. 1981.

Primary Examiner—Ronald C. Capossela
Attorney, Agent, or Firm—Leydig, Voit, Osann, Mayer and Holt, Ltd.

[57] ABSTRACT

A refrigeration system including a compressor, a condenser, an expansion valve and an evaporator with controls and interconnections to provide a system operating in a vapor refrigeration cycle containing a refrigerant or combination thereof selected from a group of low vapor pressure refrigerants having boiling points anywhere from about 10 degrees F. to 83 degrees F. and the compressor comprising an open system constrained rotary vane compressor having a ratio Q/D of cooling capacity per unit of displacement anywhere in the range from about 8,000 to 30,000 FT-LB per HR/FT$^3$ per HR determined by the refrigerant or combination thereof in the system and according to a specified formula.

3 Claims, 3 Drawing Figures

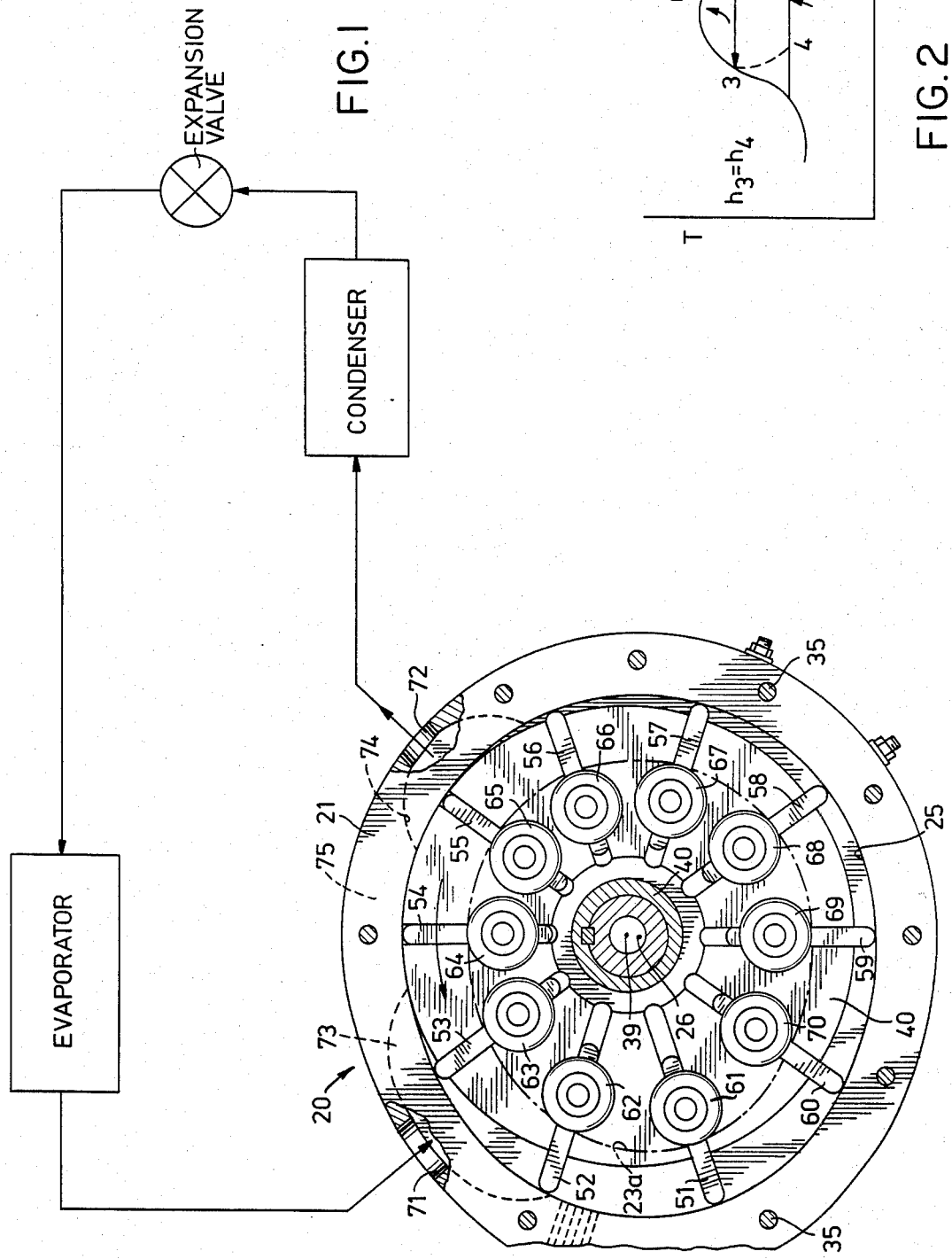

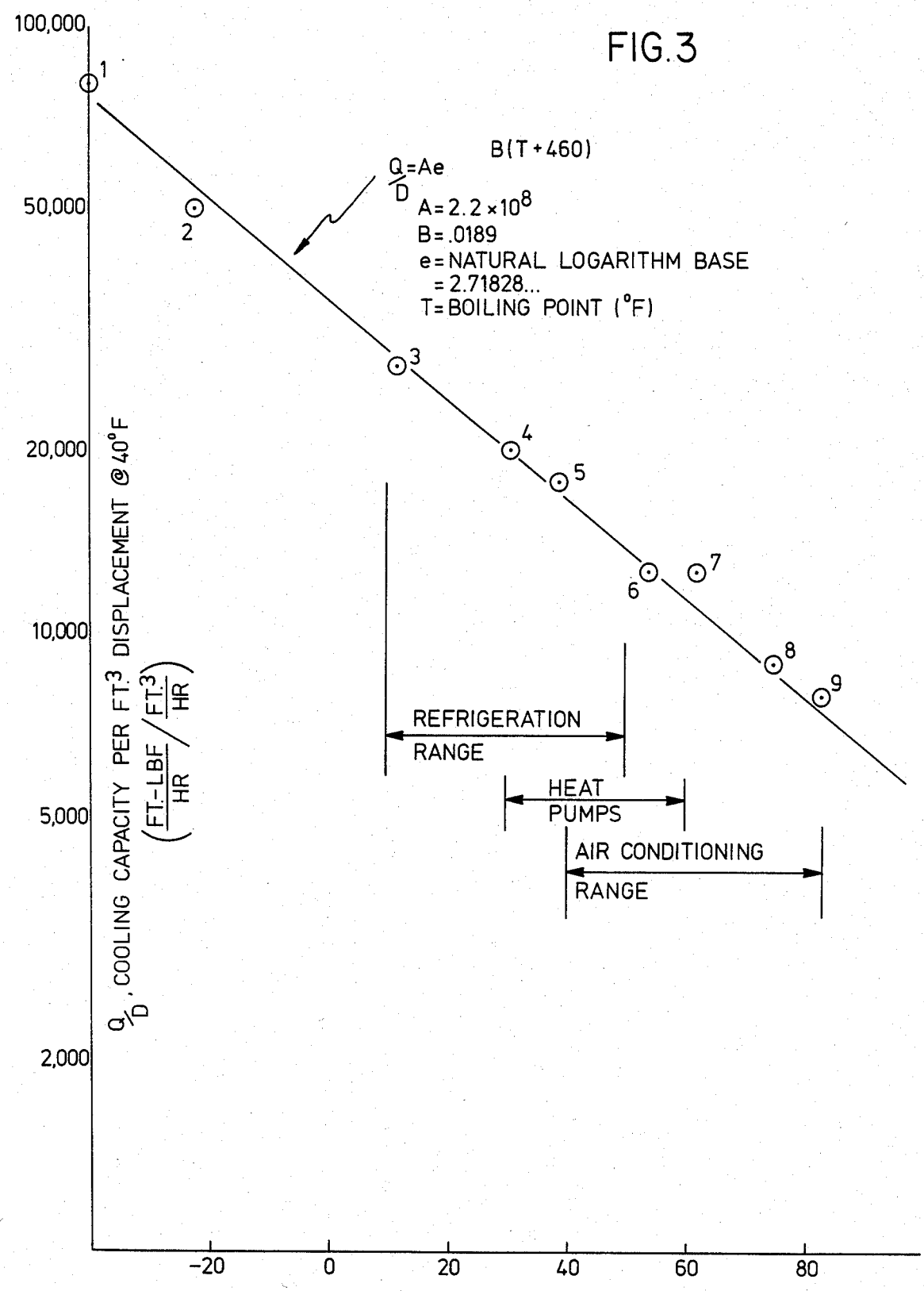

VAPOR REFRIGERATION CYCLE SYSTEM WITH CONSTRAINED ROTARY VANE COMPRESSOR AND LOW VAPOR PRESSURE REFRIGERANT

TECHNICAL FIELD

This invention relates to refrigeration systems operating in a vapor refrigeration cycle and containing low vapor pressure refrigerant.

BACKGROUND ART

The historical trend in the design, development and commercialization of the vapor refrigeration cycle system has involved the use of high vapor pressure (therefore, high density) refrigerants in order to permit the use of smaller size conventional compressors.

For small buildings, mobile vehicle, aircraft and other medium capacity heating and/or cooling applications, high vapor pressure refrigerants have been used because the limited displacement of conventional compressors which satisfy practical size limitations requires high density gases to provide adequate cooling capacity for such applications.

Leakage of refrigerant gas from compressors in systems using high vapor pressure refrigerants, however, raises very serious problems. Home air conditioning systems, for example, are expected to operate for many years without loss of refrigerant. However, exposed rotary seals of the compressors are unable to contain high pressure refrigerants for the length of time required of modern home air conditioning systems.

This has led, in the case of home air conditioning systems, for example, to the requirement for totally hermetic systems wherein the electric motors are hermetically sealed within a tank along with the compressor.

Ceramic or glass electrical feed-throughs are required to pass electrical energy to the electric motor inside. Further, the refrigerant gas is used to cool the motor. Such hermetic designs have several major disadvantages:

(a) in the event of a compressor failure, the entire hermetic system must be replaced even though the motor may be fully functional;

(b) if the electric motor fails, the entire hermetic system must be replaced and, due to the electrical failure, the entire air conditioning system will be contaminated and have to be flushed and cleaned, thereby using a considerable amount of fluorocarbons and other cleaning and purging materials to effect the cleaning process; in some cases, depending upon the mode of failure, entire subcomponents, such as heat exchangers, receiver dryers and expansion valves, must be replaced;

(c) due to the fact that the electric motor is cooled by the refrigerant gas, the condenser heat exchanger must be up-sized to withstand the additional thermal load imposed by the inefficiencies of the electric motor; this adds further to the cost of the hermetic system; and (d) the hermetic tank adds further costs to hermetic systems.

When leakage of refrigerant can be tolerated from the viewpoint of service, air conditioning and refrigeration systems employ the so-called "open system". In this configuration, a compressor with exposed rotary seals is used without a hermetically sealed electric motor. In this case, the components are discrete and separate and can, therefore, be serviced separately in the event of failure or the requirement for recharge of refrigerant. However, because the refrigerants are of high pressure, the inevitable leakage of the rotary compressor shaft seals necessitates relatively frequent recharging of the system.

In the case of automotive air conditioning systems, it has been found that the use of hermetic systems is not practical because of the inefficiencies and expense involved in having a separate high capacity alternator operating a hermetically sealed electric motor driven compressor system. Weight and complexity are particular disadvantages of hermetic systems in automotive air conditioning applications. Therefore, commercially available automotive systems are of the "open system" type and the problem of relatively frequent re-evacuation and recharging are tolerated.

Also refrigeration and air conditioning system efficiencies are limited by compressor efficiencies. Significant improvements in system efficiencies, therefore, must come from raising compressor efficiencies. However, conventional compressors requiring rotary seals to prevent leakage of high vapor pressure refrigerants have attained nearly maximum achievable efficiencies with known technology. Specifically, the typical home air conditioning compressor has an efficiency of approximately fifty percent.

The problem of refrigerant gas leakage in open systems can be substantially alleviated by using low vapor pressure refrigerant. Heretofore, low vapor pressure refrigerant has been used in refrigeration systems operating in vapor refrigeration cycles for large capacity cooling or heating applications, such as for large water chillers in building cooling systems or for shipboard environmental control systems. Such large water chillers or environmental control systems have typically employed large conventional centrifugal compressors to provide adequate cooling capacity for the application involved. It has not been found feasible in the past to use low vapor pressure refrigerant in refrigeration systems for medium capacity refrigeration or heating applications, such as for residential, automotive or aircraft heating and/or cooling, because conventional centrifugal compressors or piston compressors are generally too large to be practical in the range of displacements required for such applications. Large machines are relatively inefficient when using low density refrigerants compared with the mass flow produced and are relatively expensive to manufacture. In addition, their large size precludes the use of such machines as a practical matter in most such medium capacity applications because of space limitations.

Recently, a rotary vane compressor has been developed which is more efficient compared with conventional compressors due, primarily, to physical and dynamic constraints imposed on the vanes to eliminate sliding friction between the vane tips and stator wall by maintaining clearance at the vane tips. The term "constrained rotary vane compressor" is intended to mean rotary vane compressors having means for constraining the vanes to minimize friction between the vane tips and stator wall, compressors of this type being disclosed for example, in commonly assigned U.S. Pat. No. 4,410,305 and U.S. Pat. No. 4,299,097.

It has been found also that constrained rotary vane compressors may be constructed with a low "space" factor, i.e., ratio of external size to displacement. Another feature of constrained rotary vane compressors is that operational efficiency may be enhanced by providing large radial flow suction and discharge port areas resulting in improved port flow characteristics. Another advantage of constrained rotary vane compressors includes the potential of relatively low manufacturing cost per unit of displacement compared with conventional compressors because of mechanical clearances among the moving parts due to the large swept volume and low pressure differences between adjoining chambers within the machine.

DISCLOSURE OF INVENTION

It has now been discovered that significant improvements in vapor cycle refrigeration system efficiency may be obtained in low to medium capacity applications by utilizing a constrained rotary vane compressor in combination with a low vapor pressure refrigerant, the combination enabling the obtaining of low leakage rates due to the low pressures in the system while keeping compressor sizes within practical limits.

The principal object of this invention, therefore, is to provide a vapor cycle refrigeration system having greatly enhanced efficiency in medium capacity applications by employing the combination of a constrained rotary vane compressor and refrigerant selected from a group having boiling points anywhere within a low vapor pressure range.

A closely related object of this invention is to provide a vapor cycle refrigeration system having low leakage of refrigerant gas without hermetic construction and which has a practical size for medium capacity heating and/or cooling applications.

Another object is to provide a vapor cycle refrigeration system utilizing low vapor pressure refrigerant and which satisfies space limitations encountered in residential, small building, mobile vehicle and aircraft heating and/or cooling applications by employing in the system a constrained rotary vane compressor having a relatively low external size-to-displacement "space" factor.

Another object is to provide a vapor cycle refrigeration system for low to medium capacity applications having a longer useful life and improved performance of components during the lifetime of the system and, furthermore, having reduced complexity due to the elimination of a dryer to desiccate and capture moisture in the system, by utilizing low vapor pressure non-fluorocarbon refrigerants in place of the more corrosive fluorocarbon refrigerants which degrade mechanical performance of components over time.

A further object is to provide a vapor cycle refrigeration system which does not require a "hard" vacuum in the system and can tolerate small quantities of circulating air by utilizing a high volume throughput rate compared to conventional high pressure systems.

Another object is to provide a vapor cycle refrigeration system which employs low vapor pressure refrigerant and a compressor in which the clearances between the mechanical parts are larger than in conventional high pressure systems and thus can be manufactured utilizing efficient and inexpensive methods of manufacture.

Another important object is to teach that a vapor cycle refrigeration system having higher efficiency may be constructed by utilizing a low vapor pressure refrigerant selected from a group having boiling points anywhere in a specified range and by using a compressor having a ratio of cooling capacity per unit of displacement anywhere in a specified range and determined by the refrigerant in the system and according to a given formula for said ratio.

BRIEF DESCRIPTION OF DRAWINGS

Further objects and advantages will become apparent from the following description taken in connection with the accompanying drawings, in which:

FIG. 1 is a schematic diagram of a vapor cycle refrigeration system incorporating a constrained rotary vane compressor in accordance with this invention;

FIG. 2 is a T-s diagram of the vapor refrigeration cycle of the system of FIG. 1; and FIG. 3 is a Q/D-T diagram over the range of useful refrigerant boiling points in accordance with this invention.

BEST MODE FOR CARRYING OUT THE INVENTION

Referring to FIG. 1, a schematic diagram is shown of a refrigeration system incorporating a compressor 10, condenser 12, expansion valve 14 and evaporator 16. The system also includes controls and interconnections to provide a system operating in a vapor refrigeration cycle in either a heating or a cooling mode. Referring to FIG. 2, which is a T-s diagram of a vapor refrigeration cycle, heat $Q_L$ is added by means of the evaporator 16 at the lower temperature limit, and refrigerant fluid is evaporated to produce refrigerant gas. Heat $Q_H$ is rejected in the condenser 12 at the higher temperature limit. The same system may be used in residential or commercial buildings, for example, for both heating or cooling, but delivering usable heat from the condenser 12 or cooling effect from the evaporator 16, and when so constructed and installed functions as a heat pump.

The present invention is primarily concerned with medium capacity applications for such vapor cycle refrigeration systems. By medium capacity is meant applications requiring capacity in the range of about one-half to ten tons of refrigeration (one ton $= 9.3 \times 10^6$ foot pounds/hour) for fields of use such as residential, small building, mobile vehicle and aircraft heating and/or cooling.

While in conventional vapor cycle refrigeration systems for medium capacity applications, high vapor pressure refrigerants are generally used in order to permit the use of small compressors satisfying space limitations imposed by these applications, in accordance with this invention the systems are charged with a low vapor pressure refrigerant and a constrained rotary vane compressor is utilized. Constrained rotary vane compressors may be constructed with a sufficiently small external size to satisfy the space limitations of such applications while also providing sufficient displacement to produce cooling and/or heating effect in the quantity required for these applications with low vapor pressure refrigerants. Thus, the invention provides vapor cycle systems particularly useful for medium capacity applications of heating and/or cooling where systems with conventional compressors and low vapor pressure refrigerant would not be practical because of the large size and relative inefficiencies of such conventional compressors.

By low vapor pressure refrigerants is meant refrigerants having a boiling point from about 10 degrees F. to 83 degrees F. Included are the refrigerants within that range listed in Table I, which also includes boiling points of R-12 and R-22 and an identifying number for each refrigerant keyed to the plot on FIG. 3.

TABLE I

| Boiling Point (Degrees F.) | Refrigerant |
|---|---|
| 1 − 40 | R-22 |
| 2 − 22 | R-12 |
| 3 + 12 | Isobutane |
| 4 + 31 | N—Butane |
| 5 + 39 | R-114 |
| 6 + 54 | Ethyl Chloride |
| 7 + 62 | Ethyl Amine |
| 8 + 73 | R-11 |
| 9 + 83 | Isopentane |

Constrained rotary vane compressors are shown, for example, in commonly assigned U.S. Pat. No. 4,410,305 and U.S. Pat. No. 4,299,097, to which reference may be made for details of construction. Referring to FIG. 1, in brief, such compressors comprise a housing 21 defining a chamber having opposed parallel end walls and a curved, smoothly continuous outer wall 25 centered about a chamber axis 26. Forming the end walls of the chamber are end plates respectively mounted upon end bells 28 (only one is shown) which are clamped together by means of clamping screws 30. A rotor 32 of cylindrical shape is supported upon a shaft 34 journalled in bearings carried by the end bells, the shaft 34 being driven from one end projecting through one of the end bells. The rotor 40, dimensioned to fit between the end walls, has a plurality of equally spaced radial grooves formed therein. Occupying the grooves for sliding movement in the radial direction are a set of vanes 51–60 which are of rectangular shape profiled to fit the chamber to define enclosed compartments between them.

Each vane has a pair of axially extending stub shafts having rollers mounted thereon. The rollers, indicated at 61–70, are guided by roller tracks 23a (one is indicated) formed in the end plates, the tracks being so provided that when the vanes are urged outwardly by centrifugal force, the outer edges of the vanes follow in closely spaced proximity the outer wall 25 of the chamber.

There is provided on the inlet side of the chamber an inlet port 71 for aspiration of gas into each compartment between adjacent vanes. On the outlet side there is provided an outlet port 72 for discharging gas from each compartment in the compressed state. The rotor has its axis 39 offset laterally (upwardly) from the chamber axis 26 by an amount so as to produce engagement of the rotor at a reference region 75 at the top of the housing. With such a constrained rotary vane compressor, the gas being aspirated and discharged flows through large port areas in a radial direction, thereby bringing about high flow efficiency, the flow being with a minimum amount of drawing or turbulence. Sliding friction between the tips of the vanes and the stator wall is eliminated by constraining the vanes by means of the rollers guided by roller tracks formed in the end plates, the tips of the vanes being maintained with a very small but discrete clearance with the outer wall to minimize leakage of gas around the vane from compartment to compartment.

It has been found that constrained rotary vane compressors have a "space" factor, i.e., external size-to-displacement ratio, which is significantly lower compared to conventional compressors of the rotary vane, centrifugal and piston types.

To demonstrate the lower space ratio S of constrained rotary vane compressors compared with typical conventional compressors, refer to the following Table II in which dimensions for different type machines are listed. External displacement volume is measured by displacing fluid. For the sizes given in the Table, the ratio S is about 6.1 for a constrained rotary vane compressor having an external cylindrical volume of about 221 cubic inches. This compares with values of S ranging from about 25 to 95 for the other machines described in Table II.

TABLE II

| Compressor | Displacement | External Size | S Ratio |
|---|---|---|---|
| Constrained Rotary Vane | 36 cu. in. | 221 cu. in. | 6.1 |
| GM Model 1131200 Piston | 7 cu. in. | 200 cu. in. | 22 |
| York VR4709 Rotary Vane | 7 cu. in. | 174 cu. in | 25 |
| Nippondenso Model 2C-90 | 7 cu. in. | 175 cu. in. | 25 |
| A. D. Little (Scroll Compressor) | 5.17 cu. in. | 490 cu. in. | 95 |

From Table II it is clear that a constrained rotary vane compressor which is preferred for systems of this invention has a significantly lower ratio S as contrasted to conventional compressors. This is extremely important as a practical matter in vapor cycle refrigeration systems of this invention using low vapor pressure refrigerant. To employ conventional compressors in a vapor cycle refrigeration system would require machines at least four times as large externally as constrained rotary vane compressors in order to displace the refrigerant flow required with low vapor pressure refrigerant. Due to space limitations in the applications to which this invention is addressed, such large machines are normally not feasible. Moreover, larger conventional compressors having sufficient displacement to satisfy the cooling capacity requirements of the fields of application of this invention have low efficiency. The poor efficiency of the conventional compressors is further degraded due to the fact that the low density aggravates the "pro-rata" friction involved in moving the same amount of mass flow because more machinery, and thus more friction, in involved.

In order to illustrate the relationship between refrigerant boiling point and compressor cooling capacity per unit of displacement in vapor cycle refrigeration systems, reference is made to FIG. 3, which graphically depicts this relationship for a low side (evaporator) pressure of 40 degrees F. The plot is made on a semilog scale and illustrates the relationship:

$$Q/D = Ae^{B(T+460)}$$

where
  $A = 2.2 \times 10^8$
  $e$ = natural log base
  $B = -0.0189$
  $T$ = boiling point of refrigerant (degrees F.).

FIG. 3 illustrates a plot for the ratio Q/D for a range of temperature of refrigerant boiling points from about −20 degrees F. to 83 Degrees F. A group of low vapor pressure refrigerants having boiling points within this range from about 10 degrees F. to 83 degrees F. include those listed in Table I which are identified by a corresponding numeral on the plot.

It will also be observed from FIG. 3 that the displacement for any compressor to produce the required cooling capacity for a given application may be determined from the equation for the ratio Q/D or, more conveniently, directly from the plot of FIG. 3, given the temperature "T" of the boiling point of the refrigerant to be employed in the vapor cycle refrigeration system. A corresponding plot may be made for any different evaporator temperature by a recalculation of the constants in the equation for the ratio Q/D.

To determine the displacement and external size of constrained rotary vane compressors for different capacity vapor cycle refrigeration systems using a selected low vapor pressure refrigerant is facilitated with the plot for Q/D depicted in FIG. 3.

Two examples are given to illustrate the range of displacement of constrained rotary vane compressors required for medium capacity systems constructed according to this invention.

For a ten ton system, with R-11 as the refrigerant, from FIG. 3,

Q/D = 9,200 ft.lb/hr/ft$^3$/hr
Q = 10(tons) × 9.3 × 10$^6$ = 93.6 × 10$^6$ ft.lb/hr
D = 93.6 × 10$^6$/9,200 = 10.2 × 10$^3$ ft$^3$/hr
D = 167 in$^3$/rev at a nominal shaft speed 1750 RPM
External Size = 6.1 × 167 in$^3$ = 1019 in$^3$ = diameter 12 inches, width 9 inches.

For a one-half ton system, with isobutane as the refrigerant, from FIG. 3,

Q/D = 28,000 ft.lb/hr/ft$^3$/hr
Q = ½(ton) × 9.3 × 10$^6$ = 4.65 × 10$^6$ ft.lb/hr
D = 4.65 × 10$^6$/28,000 = 0.16 × 10$^3$ ft$^3$/hr
D = 26.3 in$^3$/rev at a nominal shaft speed 1750 RPM
External Size = 6.1 × 26.3 = 160 in$^3$ = diameter 6 inches, width 5.7 inches.

From the above calculations it will be seen that it is advantageous to specify size of the constrained rotary vane compressor required for different refrigeration system tonnages in terms of cooling capacity per unit of compressor displacement, i.e., the ratio Q/D. If compressor size is specified in terms of displacement D, it also becomes necessary to specify compressor speed and whether such speed is variable or fixed. The ratio Q/D generalizes the relationship involved and, when plotted against refrigerant boiling point, provides a graphical aid to determine compressor size for given system capacities. It is also necessary, however, to specify evaporation temperature and to factor that into the determination of Q/D, as previously stated.

With systems constructed according to this invention, the evaporator temperatures and condenser pressures are varied according to system requirements. However, the high side pressures are maintained below about 120 psig in order to obtain low leakage without necessity for a hermetic construction, thus providing systems with high efficiency and low leakage.

We claim:

1. A refrigeration system including a compressor, a condenser, an expansion valve and an evaporator with controls and interconnections to provide a system operating in a vapor refrigeration cycle, said system containing a refrigerant or combination thereof selected from a group of low vapor pressure refrigerants having boiling points anywhere from about 10 degrees F. to 83 degrees F., said compressor comprising an open system constrained rotary vane compressor having a ratio Q/D of cooling capacity per unit of displacement anywhere in the range from about 8,000 to 30,000 FT-LB per HR/FT$^3$ per HR determined by the refrigerant or combination thereof in the system and according to $$Q/D = Ae^{B(T+460)}$$

where (For 40 degree evaporator temperature)
$A = 2.2 \times 10^8$
$e$ = natural logarithm base
$B = -.0189$
$T$ = boiling point of refrigerant (degrees F.)

for medium capacity refrigeration, air conditioning and heat pump applications.

2. A refrigeration system including a compressor, and means providing a system operable in a vapor refrigeration cycle, said system containing any refrigerant or combination thereof from a group of low vapor pressure refrigerants having boiling points from about 10 degrees F. to 83 degrees F., and said compressor comprising an open system constrained rotary vane compressor having a ratio Q/D of cooling capacity per unit of displacement anywhere in the range of from about 8,000 to 30,000 FT-LB per HR/FT$^3$ per HR determined by the refrigerant or combination thereof in the system and according to $$Q/D = Ae^{B(T+460)}$$

where (For 40 degree evaporator temperature)
$A = 2.2 \times 10^8$
$e$ = natural logarithm base
$B = -.0189$
$T$ = boiling point of refrigerant (degrees F.)

for refrigeration, air conditioning and heat pump applications in the range of about one-half to ten tons of refrigeration capacity.

3. A refrigeration system according to claim 2 in which high side pressures at the output of said compressor do not exceed about 120 psig.

* * * * *